March 10, 1964  J. W. SMITH ETAL  3,124,738
OVERVOLTAGE PROTECTION APPARATUS
Filed Dec. 16, 1960

INVENTORS
John W. Smith
Donald F. Cleary
by Edward V. Connors
ATTORNEY

United States Patent Office 3,124,738
Patented Mar. 10, 1964

3,124,738
OVERVOLTAGE PROTECTION APPARATUS
John W. Smith, Whitestone, and Donald F. Cleary, West Islip, N.Y., assignors to Hogan Faximile Corporation, New York, N.Y.
Filed Dec. 16, 1960, Ser. No. 76,300
4 Claims. (Cl. 321—14)

The present invention relates to a circuit for protecting a solid state device or the like against over-voltage conditions in the circuit.

It is well known that solid state devices are particularly susceptible to over-voltage conditions even of short periods such as might be occasioned by the switching of a device on the line having large inductance. In order to protect the solid state devices, fuses in low ranges of amperage, and delicate quick acting circuit breakers have been utilized. In some cases protective spark gaps have been connected in the circuit. However, it has been found that because of the low voltages generally used, the spark gap is not wholly satisfactory, the operating time of the fuses has been too long, and the operation of the delicate circuit breakers has not been wholly satisfactory both because of their cost and because of their inability to withstand shocks and vibrations.

The present invention aims to overcome the defects and disadvantages of prior means for the protection of the solid state devices, and which is exceedingly fast in operation. In accordance with the invention this is accomplished by connecting a zener diode across at least a portion of the source and by providing a relay in parallel with the diode. The construction in accordance with the invention is advantageous in that for the case of an overvoltage peak of short duration a resistance drop is provided preventing damage to the solid state device but maintaining the circuit in operative condition. However, if the duration of the over-voltage condition is continued a relay is operated which disconnects the source from the solid state device.

Another object of the invention is to provide an overvoltage protective circuit for a solid state device or the like which is simple and economical in manufacture, efficient in operation and durable in use.

Other objects and advantages of the invention will be apparent from the following description and from the accompanying drawing which shows, by way of example, an embodiment of the invention.

Figure 1:
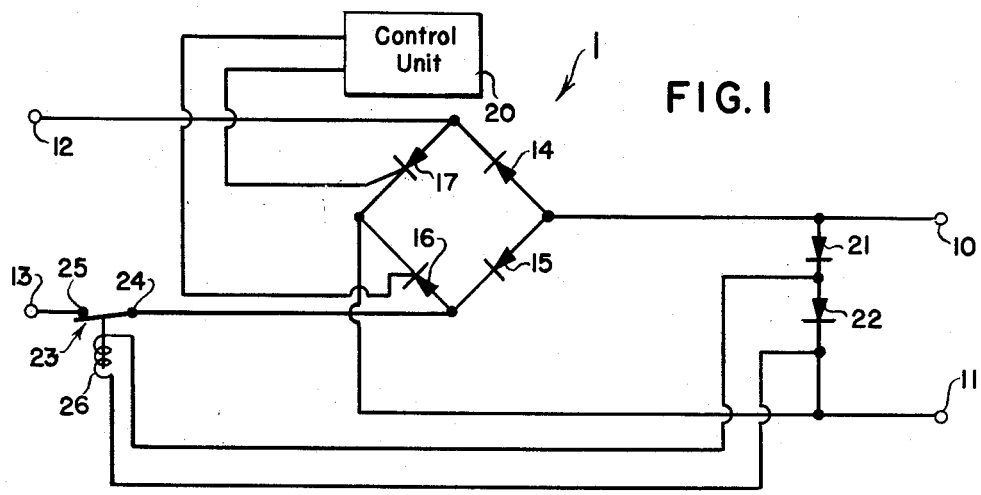
FIGURE 1 is a schematic wiring diagram of the power supply incorporating an over-voltage device in accordance with the invention.

Referring to FIGURE 1 there is shown a power supply 1 such as might be used for providing rectified current at its output terminals 10 and 11 from a source of alternating current connected to the input terminals 12 and 13. The power supply 1 includes a pair of diodes 14 and 15 connected in a bridge circuit with a pair of controlled silicon rectifiers 16 and 17. The circuit may be controlled by a control unit 20 which may be merely an on and off switch or may include means for electrically controlling the firing phase angle of the controlled silicon rectifiers 16 and 17 and thereby effectively controlling the rectified output.

The protective circuit in accordance with the invention includes one or more zener diodes 21 and 22 connected in series across the output 10 and 11. Alternatively, any suitable connection might be used as is well known in the art whereby the zener diodes 21 and 22 are connected across only a portion of the output circuit, as from one or the other of the output terminals to ground. Across one of the zener diodes 21 or 22 is connected a relay 23 having a pair of relay contacts 24 and 25 connected in series with the source of current and the solid state rectifier. The relay 23 has an operating coil 26 having its terminals in parallel with the zener diode and is adapted to lock in the open position, being manually reclosable by means not illustrated.

The overvoltage protection circuit composed of diodes 21 and 22 affords double acting overvoltage protection. The avalanche breakdown point of the two diodes in series is selected for a voltage above the normal output voltage of the supply and below the safe maximum voltage for the transistors or other elements in the load circuit. In the event of a sudden rise in output voltage to the breakdown point the two diodes will begin conduction and, acting against the internal resistance of the power supply, will limit the output voltage to their breakdown voltage. This action can be very fast, possibly occurring in one microsecond or less, so that protection is afforded against fast rising transients that could damage or destroy transistors.

Since the power supply is capable of delivering high currents (20 a. to 40 a.) at voltages of possibly 75 to 100 volts, a steady over-voltage condition would result in a great deal of power dissipation in the avalanche diodes and would result in their destruction if the overvoltage condition persisted for any length of time. During the overvoltage condition, a steady potential is present across the diode 22. This potential, if present for more than a few milliseconds, actuates relay 23. When actuated, relay 23 opens the primary power circuit and latches in the open circuit condition. This means that the primary power source is interrupted and stays interrupted until it is manually reset.

The diodes 21 and 22 are used in series with the coil 26 of relay 23 across the lower one for very definite reasons. Breakdown point of the series pair of diodes is a well determined voltage so that protection is afforded at a closely determined point. If the lower diode were removed and the circuit completed through the coil 26 of relay 23, inductance in the coil would make it impossible to determine accurately the breakdown point to fast rising overvoltage surges. Note that the diode 21 actually determines the breakdown point of the protection circuit for steady state conditions. This is so because the lower end of this diode is connected to ground through the coil 26 of the relay 23. Hence, it is common to have a ratio of breakdown voltages between the two diodes of possibly 10/1 or more so that the protection against fast rising transients will occur at a voltage only a little greater than the breakdown voltage of the upper diode.

Figure 2:
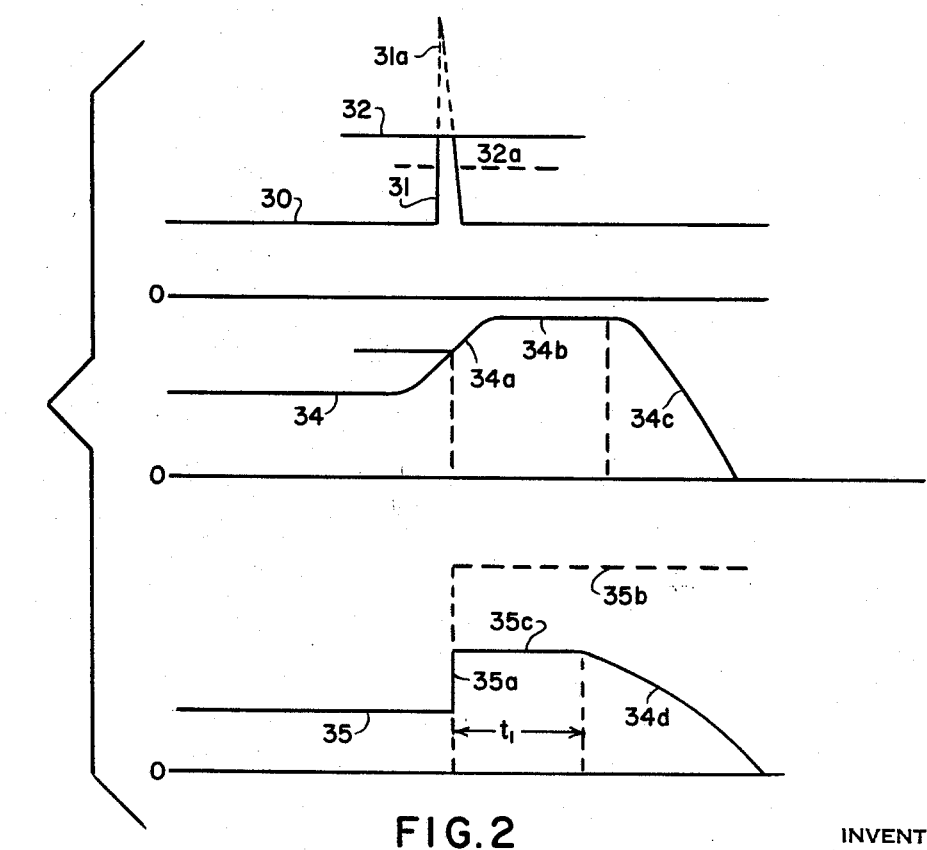
FIGURE 2 is a series of curves illustrating the operation of the circuit.

Referring to FIGURE 2 there is shown a curve 30 showing a voltage 31 thereon. The upper portion of the peak 31a is shown dotted. The horizontal line 32 represents the operating point or the zener voltage of the diodes 21 and 22. The line 32a indicates the operating voltage of one of the diodes 21 or 22. It should be noted that upon the occurrence of a voltage spike 32 the diodes 21 and 22 become conducting and thereby prevent the development of the peak 31a. Curve 34 illustrates a voltage condition having a slowly rising portion 34a. It will be noted that further rise of the voltage 34a is prevented by the diodes 21 and 22 which maintains a flat portion of the voltage curve as indicated at 34b. Relay contacts 24—25 then open and the voltage gradually decays to zero, generally as indicated at 34c. Curve 35 illustrates the condition wherein there is a sharp rise in voltage as indicated at 35a and which would continue as indicated at 35b unless prevented by the use of the circuit disclosed herein. Flat portion of the curve as indicated at 35c illustrates the effectiveness of the zener diodes in holding the voltage within a prescribed limit for the time period $T_1$ until the relay contacts open allowing the voltage to decay to zero as indicated at 34d.

While the invention has been described with reference to a specific embodiment thereof, it will be understood that other embodiments may be resorted to without departing from the invention. Therefore, the form of the invention set out above should be considered as illustrative and not as limiting the scope of the following claims.

We claim:

1. A circuit for protecting a solid state device load against damage by overvoltage conditions comprising a source of alternating electric current, a rectifier connected in a circuit with the source of alternating current, a pair of zener diodes connected across the output of the rectifier, a relay switch including normally closed switch contacts and an operating coil, the switch contacts connected in series between the source and the rectifier, the relay operating coil connected in parallel with one of the zener diodes, the relay switch having an operating time constant of greater magnitude than the operating time constant of the zener diode so that upon the occurrence of an excessive voltage rise of the direct current a voltage drop is provided by the zener diode thereby protecting the solid state device load for the period of time until the relay contacts are opened.

2. A circuit for preventing a voltage rise in the output of a direct current power supply comprising a source of alternating electric current, a solid state rectifier having at least input and output electrodes, the rectifier input and output electrodes connected in series between the source and the load, a pair of zener diodes connected in series across the output of the rectifier, and a relay switch including normally closed switch contacts and an operating coil, the switch contacts connected in series between the source of supply and the rectifier, the operating coil connected in parallel with one of the zener diodes, the other of said zener diodes determining the breakdown point of the overvoltage circuit for steady state conditions.

3. A circuit for preventing a voltage rise in the output of a direct current power supply comprising a source of alternating electric current, a load, a controlled silicon rectifier having at least input and output electrodes, the controlled silicon rectifier input and output electrodes connected in series between the source and the load, a pair of zener diodes connected in series across the load, and a relay switch including normally closed switch contacts and an operating coil, the switch contacts connected in series between the source of supply and the rectifier, the operating coil connected in parallel with one of the zener diodes, the other of said zener diodes determining the breakdown point of the overvoltage circuit for steady state conditions.

4. A circuit for preventing a voltage rise in the output of a direct current power supply comprising a source of alternating current, a load, a bridge connected solid state rectifier including a pair of controlled rectifiers, the rectifier bridge adapted to be connected in series between the alternating current source and the load, a pair of zener diodes connected in series across the load, and a relay switch including normally closed contacts and an operating coil, the switch contacts connected in series between the source of alternating current and the rectifier, the operating coil connected in parallel with one of the zener diodes, the relay switch having an operating time constant of greater magnitude than the zener diodes, so that upon the occurrence of an excessive voltage rise of the current source a voltage drop is provided by the zener diodes thereby preventing a voltage rise in the direct current voltage for the period of time until the relay contacts are opened.

References Cited in the file of this patent

UNITED STATES PATENTS

| | | |
|---|---|---|
| 2,769,131 | Immel | Oct. 30, 1956 |
| 2,832,900 | Ford | Apr. 29, 1958 |
| 2,948,843 | Klein | Aug. 9, 1960 |
| 3,049,632 | Staples | Aug. 14, 1962 |
| 3,058,034 | Sandin | Oct. 9, 1962 |